(12) United States Patent
Wu et al.

(10) Patent No.: US 6,645,088 B2
(45) Date of Patent: Nov. 11, 2003

(54) REACTION INJECTION MOLDABLE COMPOSITIONS, METHODS FOR MAKING SAME, AND RESULTANT GOLF ARTICLES

(75) Inventors: Shenshen Wu, North Dartmouth, MA (US); Murali Rajagopalan, South Dartmouth, MA (US); Manjari Kuntimaddi, New Bedford, MA (US); Kevin M. Harris, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 67 days.

(21) Appl. No.: 09/833,598

(22) Filed: Apr. 13, 2001

(65) Prior Publication Data

US 2002/0173379 A1 Nov. 21, 2002

(51) Int. Cl.[7] .................. A63B 37/06; A63B 37/08; A63B 37/00
(52) U.S. Cl. ........................ 473/367; 473/351
(58) Field of Search ................. 473/351–377

(56) References Cited

U.S. PATENT DOCUMENTS

| | | |
|---|---|---|
| 2,376,085 A | 5/1945 | Radford et al. |
| 3,147,324 A | 9/1964 | Ward |
| 3,989,568 A | 11/1976 | Isaac |
| 4,123,061 A | 10/1978 | Dusbiber |
| 4,695,055 A | 9/1987 | Newcomb et al. |
| 4,762,322 A | 8/1988 | Molitor et al. |
| 4,766,194 A | 8/1988 | Robertson |
| 4,878,674 A | 11/1989 | Newcomb et al. |
| 4,923,934 A | 5/1990 | Werner |
| 5,084,513 A | 1/1992 | Zijderveld et al. |

(List continued on next page.)

FOREIGN PATENT DOCUMENTS

| | | |
|---|---|---|
| JP | 62-14869 | 1/1987 |
| JP | 62-14870 | 1/1987 |
| JP | 4-261680 | 9/1992 |
| JP | 8-108444 | 4/1996 |
| WO | WO 98/37929 | 3/1998 |
| WO | WO 00/57962 | 10/2000 |

OTHER PUBLICATIONS

Richter, Reinhard et al., "Isocyanates, Organic", Kirk–Othmer Encyclopedia of Chemical Technology, Copyright 1995 by John Wiley & Sons, Inc.*

(List continued on next page.)

Primary Examiner—Paul T. Sewell
Assistant Examiner—Alvin A. Hunter, Jr.
(74) Attorney, Agent, or Firm—Swidler Berlin Shereff Friedman, LLP

(57) ABSTRACT

The invention relates to a method for forming golf equipment, or a portion thereof, preferably for forming one or more layers of a golf ball, including: providing a first reactable component containing an isocyanate-containing compound, and a second reactable component containing at least one polyol, polyamine, or epoxy-containing compound; mixing the reactable components together to form a reactive mixture; and injecting the reactive mixture into a cavity or mold having a desired shape within a time sufficient to avoid substantial polymerization, gelation, or solidification. Alternately, instead of providing an isocyanate-containing reactable component and at least one polyol, polyamine, or epoxy-containing compound, the method may include providing at least two sets of precursor components that can be reacted to form at least two different polymers of an interpenetrating polymer network, at least one polymer being crosslinked, wherein, if any of the at least two component sets include a mixture of precursor components, then that mixture must be sufficiently non-reactive such that the sets of precursor components, when placed in contact with each other, can still form an interpenetrating polymer network.

32 Claims, 2 Drawing Sheets

U.S. PATENT DOCUMENTS

| | | | |
|---|---|---|---|
| 5,210,109 A | 5/1993 | Tateosian et al. | |
| 5,241,020 A | 8/1993 | Roha | |
| 5,306,784 A | 4/1994 | Pater | |
| 5,331,062 A | 7/1994 | Sorathia et al. | |
| 5,334,673 A | 8/1994 | Wu | |
| 5,356,941 A | 10/1994 | Sullivan et al. | 521/96 |
| 5,539,053 A | 7/1996 | Avenel | 525/123 |
| 5,542,677 A | 8/1996 | Sullivan et al. | 473/385 |
| 5,591,803 A | 1/1997 | Sullivan et al. | 525/196 |
| 5,648,432 A | 7/1997 | Pater et al. | 525/421 |
| 5,674,942 A | 10/1997 | Hill et al. | 525/131 |
| 5,692,974 A | 12/1997 | Wu et al. | 473/377 |
| 5,709,948 A | 1/1998 | Perez et al. | 428/413 |
| 5,786,426 A | 7/1998 | Sperling et al. | 525/131 |
| 5,816,937 A | 10/1998 | Shimosaka et al. | 473/354 |
| 5,885,172 A | 3/1999 | Hebert et al. | 473/354 |
| 5,908,358 A | 6/1999 | Wu | 473/378 |
| 6,083,119 A | 7/2000 | Sullivan et al. | 473/354 |
| 6,100,336 A | 8/2000 | Sullivan et al. | 525/196 |
| 6,287,217 B1 * | 9/2001 | Sullivan et al. | 473/374 |
| 6,290,614 B1 * | 9/2001 | Kennedy et al. | 473/378 |

OTHER PUBLICATIONS

Polyurethanes Glossary, Second Edition, Bayer Corporation, Feb. 2000, 21 pages.

Edward F. Cassidy et al., Two–Component Interpenetrating Polymer Networks (IPN's) from Polyurethane and Epoxies, Journal of Elastomers and Plastics, vol. 16, Apr. 1984, pp. 84–91.

Colorim Systems, Reaction Injection Molding of Light Stable Polyurethane Systems.

Harry George, Reaction Injection Molding (RIM) Technology—New Horizons, Fall Meeting of the Polyurethane Manufacturers Association, Sep. 30, 2000, pp. 1–10.

Feng Jun Hua et al., Graft Interpenetrating Polymer Networks Composed of Epoxy Resin and Urethane Acrylate Resin, Journal of Polymer Science, vol. 37, pp. 3568–3574.

Lin Hua Fan et al., Mechanical Properties of Hand–Cast and Reaction Injection Molded Polyurethane and Vinyl Ester Resin Interpenetrating Polymer Networks, Polymer Engineering and Science, Feb. 1997, vol. 37, No. 2, pp. 338–445.

D. Klempner et al., Two and Three Component Interpenetrating Polymer Networks, Polymer Engineering and Science, Mid–Jun. 1985, vol. 25, No. 8, pp. 488–493.

D. Klempner et al., Interpenetrating Polymer Networks, Advances in Chemistry Series, American Chemical Society, 1994, pp. 1–38.

Yvonne S–K Lee et al., A Study in the Formation and Characterisation of Oxazolidone–Isocyanurate Polymers Using Differential Scanning Calorimetry and Infrared Spectroscopy, British Polymer Journal, vol. 22, No. 2, 1990, pp. 97–105.

R. J. Lockwood et al., Leisure Products Via RIM, The Upjohn Company, 4 pages.

Bernie Miller, Nylon RIM Makes Strong Showing at Conference, Plastics World, Jul. 1994, pp. 38–40.

Andrew Poole, Innovation in RIM Polyurethane Markets, Mobay Chemical Corporation, Oct. 1985, pp. 1–9.

Phillip Schneider, KraussMaffe Corporation, pp. 1–12.

* cited by examiner

REACTION INJECTION MOLDABLE COMPOSITIONS, METHODS FOR MAKING SAME, AND RESULTANT GOLF ARTICLES

FIELD OF THE INVENTION

The invention relates to a reaction injection molding process and compositions for forming golf equipment or components thereof, particularly for forming layers of golf balls in one embodiment. The reaction injection molding process of the invention involves providing at least two reactable components that have a fast reaction time and injecting them with sufficient speed after they are mixed so that they are polymerized, solidified, or gelled in a mold cavity.

BACKGROUND OF THE INVENTION

It is well known to even the average golfer that the equipment used in playing the game is subject to a great deal of friction, impact, and other stresses during a typical round of golf. Both the performance and the useful life of such equipment would benefit from the use of materials having increased durability. For instance, many types of golf clubs, such as putters, drivers, and wedges, contain polymer inserts in the face of the club. Since the club face directly strikes a golf ball thousands of times over the life of the club, improved durability is of great importance. Additionally, club components, such as shafts, grips, and hosels, undergo significant stress during a golf swing and contact with a golf ball and, therefore, could stand to benefit from more durable materials.

Of course, golf balls are repeatedly struck against very hard objects as well, including golf clubs, and it is very desirable to maintain their performance properties over as long a period of time as possible. Golfers of all skill levels seek out a variety of properties in their golf balls for a variety of golfing situations, although resilience, durability, and longevity are always important. The type of materials used in forming the different golf ball layers can greatly affect these properties, as well as the "click," "feel," spin, initial velocity, "playability," and other properties.

Golf equipment is typically formulated from a variety of different materials. Most conventional materials, however, do not entirely address the problems associated with stress, durability, and repeated impact. Therefore, it is clear that improved materials, having material properties that address these preferred physical requirements, are necessary.

In addition, the manner in which golf equipment, or components thereof, is fabricated can affect certain properties of the materials, for example, such as durability. The types of chemistries present in the golf equipment materials can also sometimes indicate or dictate the preferred method of fabrication used to form them.

Particularly with respect to polyurethane-containing materials, commercially available golf equipment or components, especially for golf balls, can be currently made by casting or injection molding processes. The nature of current casting processes is such that materials that require a relatively long time (in comparison to other fabrication methods) to sufficiently solidify, i.e., react thoroughly. As a result, materials or compounds with particular chemistries that react or solidify relatively quickly are generally restricted from use in commercial casting processes, particularly in the golf art.

By using an alternative fabrication technique, reaction injection molding, as opposed to traditional injection molding, thermosetting materials and/or materials with relatively quick reaction or solidification times can be processed into certain articles. Reaction injection molding processes, due to the nature of the chemistries of the materials used, tend to result in decreased fabrication times, and can facilitate a decrease in the cost of fabricating such articles. The technique of reaction injection molding (RIM) using a variety of materials has been demonstrated in various publications.

For example, U.S. Pat. No. 4,762,322 discloses golf clubs with heads that can be made from a hollow metal shell or a low density, high strength material, such as a reaction injection molded polyurethane, formed around weighted inserts.

With respect to manufacture of golf balls, RIM has been disclosed, for example, in International Publication No. WO 00/57962, which claims golf balls, and processes for making such balls, comprising a reaction injection molded material, such as polyurethanes/polyureas.

In addition, U.S. Pat. No. 6,083,119 discloses a multi-layer golf ball with an inner and outer cover layer, at least one of which can contain a reaction injection molded polyurethane material.

U.S. Pat. Nos. 4,695,055 and 4,878,674 also disclose illuminated, translucent golf balls having a permanent diametric hole into which a chemiluminescent light stick is added, so that the golf balls may be visible in the dark. These golf balls can be fabricated by a method such as reaction injection molding.

Additionally, conventional non-reactive injection molding can be used to form relatively thin layers of material in golf equipment, or components thereof, generally in golf balls. Examples of thin components or layers made by conventional non-reactive injection molding have also been demonstrated in various publications.

SUMMARY OF THE INVENTION

One aspect of the invention relates to a method for forming golf equipment, or a portion thereof, preferably for forming one or more layers of a golf ball, including: providing a first reactable component including an isocyanate-reactive component, preferably including a polyisocyanate or including a prepolymer or quasi-prepolymer containing the reaction product of a polyol, polyamine, or epoxy-containing compound with at least one polyisocyanate, and a second reactable component including at least one of a polyol, polyamine, or epoxy-containing compound; combining the reactable components together to form a reactive mixture; and injecting the reactive mixture into a cavity or mold having a desired shape within a time sufficient to avoid substantial gelation or solidification. Advantageously, the polymerization, solidification, or gelation times of the reactive mixture of the present invention should typically be within about 60 seconds, preferably within about 45 seconds, more preferably from about 0.25 seconds to 30 seconds, most preferably from about 0.5 seconds to 15 seconds, after combining, either at ambient or elevated temperatures. In various other embodiments, the polymerization, solidification, or gelation times of the reactive mixture of the present invention are from about 1 second to 10 seconds or from about 1 second to 5 seconds after combining.

In a preferred embodiment, each of the at least two reactable components have a viscosity not more than about 20,000 cPs, preferably not more than about 15,000 cPs, more preferably from about 25 cPs to 10,000 cPs, most preferably from about 25 cPs to 5,000 cPs, all at ambient or elevated temperatures. In another preferred embodiment, all the reactable components, or mixtures thereof each contained separately, that form the reactive mixture have viscosities similar to those of the first and second reactable components at ambient or elevated temperatures. In yet another preferred embodiment, each reactable component has a viscosity not more than about 5,000 cPs, preferably not more than about 1,000 cPs, at a temperature of about 150° F. In one embodiment, the mixture is injected into the mold or cavity at an injection pressure of not more than about 2,500 psi. In another embodiment, the viscosity index of any two of the reactable components is from about 1000 to 1, preferably from about 800 to 20, at ambient temperature or at a temperature at which the reactable components are combined.

In one preferred embodiment, the isocyanate-containing compound or the polyisocyanate includes a diisocyanate having the generic structure:

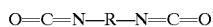

where R is a cyclic, aromatic, or linear branched or unbranched hydrocarbon chain each having a moiety containing from about 1 to 20 carbon atoms. When multiple aromatic or cyclic groups are present, linear and/or branched hydrocarbons containing from about 1 to 10 carbon atoms can be present as spacers between the aromatic or cyclic groups. In some cases, the cyclic or aromatic group(s) may be substituted at the 2-, 3-, and/or 4-positions, or at the ortho-, meta-, and/or para-positions, respectively, with: halogens; primary, secondary, or tertiary hydrocarbon groups; or a mixture thereof. In another preferred embodiment, the isocyanate-containing compound or the polyisocyanate includes higher functional adducts of diisocyanates, e.g., such as the isocyanurate of TDI, the isocyanurate of a hexamethylene diisocyanate, the uretdione of TDI, the uretdione of HDI, or a mixture thereof. In yet another preferred embodiment, the isocyanate-containing compound or the polyisocyanate includes a triisocyanate or higher functional polyisocyanate that is not an adduct of a diisocyanate, or a mixture thereof. In a more preferred embodiment, the polyisocyanate contains PPDI, MPDI, MDI, or TDI, more preferably MDI. In one preferred embodiment, the second reactable component can include more than one polyol, polyamine, or epoxy-containing compound, at least one compound which preferably has a molecular weight less than about 400 g/mol, and at least a second compound of which is preferably a polyether polyol, a hydroxy-terminated polybutadiene, a polyester polyol, a polycarbonate polyol, or a mixture thereof, more preferably a partially or fully hydrogenated hydroxy-terminated polybutadiene. In this preferred embodiment, the second reactable component preferably has a number average molecular weight of not less than about 200 g/mol, more preferably from about 200 g/mol to 4,000 g/mol. In one embodiment, the second polyol, polyamine, or epoxy-containing compound may advantageously be present in an amount from about 40% to 95% based on the total weight of the first and second reactable components. In another embodiment, the total amount of the first reactable component plus the first polyol, polyamine, or epoxy-containing compound may advantageously be from about 5% to 60% based on the total weight of the first and second reactable components. In one preferred embodiment, the first reactable component includes greater than about 14% by weight of unreacted isocyanate groups. In another preferred embodiment, the first reactable component includes less than about 14% by weight of unreacted isocyanate groups. In yet another preferred embodiment, the first reactable component includes a low free isocyanate monomer composition.

Another aspect of the invention relates to a method for forming golf equipment, or a portion thereof, including: providing at least two sets of precursor components that can be reacted to form at least two different polymers of an interpenetrating polymer network, at least one polymer being crosslinked; combining the sets of precursor components together to form a reactive mixture; and injecting the reactive mixture into a cavity or mold having a desired shape within a time sufficient to avoid substantial polymerization, gelation, or solidification. In one preferred embodiment, the at least two sets of precursor components include a first reactable component, which contains an isocyanate-containing compound, and a second reactable component, which contains an isocyanate-reactive compound.

Another aspect of the invention relates to a method for forming golf equipment, or a portion thereof, including: providing at least two reactable components that, when combined, can form a foamed polymeric material; combining the reactable components together to form a reactive mixture; and injecting the reactive mixture into a cavity or mold having a desired shape within a time sufficient to avoid substantial polymerization, gelation, or solidification, and such that the reactive mixture forms a foamed material, preferably an open-cell, a closed-cell, or a microcellular foam, also preferably with a specific gravity of not more than about 1, more preferably not more than about 0.8, most preferably not more than 0.5.

In one embodiment where the golf equipment that is formed includes one or more layers of a golf ball, the golf ball can have a solid or fluid-filled center, optionally at least one intermediate layer disposed about the center, and at least one cover layer disposed about the center and the optional intermediate layer, if present. In one embodiment, the cover layer of the golf ball has a first material hardness and the layer disposed immediately inside the cover layer has a second material hardness, and the first material hardness is greater than the second material hardness. In that embodiment, the first material hardness can be at least about 55 Shore D, or the second material hardness can be up to about 55 Shore D. In another embodiment, the second material hardness is greater than the first material hardness. In that embodiment, the first material hardness can be up to about 55 Shore D, or the second material hardness can be at least about 55 Shore D. In yet another embodiment, the cover material hardness is greater than about 15 Shore A. In a preferred embodiment, the core of the golf ball has an outer diameter from about 1.55 inches to 1.67 inches. In another embodiment, the injecting results in the formation of golf equipment, or a portion thereof, which has a thickness less than about 0.065 inches, alternately less than 0.01 inches. In another preferred embodiment, the equipment has a coefficient of restitution of greater than about 0.7, preferably greater than about 0.75, and more preferably greater than about 0.78, at an initial velocity of 125 ft/s. In another preferred embodiment, the golf ball, or a portion thereof, has an Atti compression of at least about 40, preferably from about 50 to 120, more preferably from about 60 to 100.

In one embodiment, the injecting or the method results in the formation of golf equipment, or a layer or portion thereof, which layer or portion has a moisture vapor transmission rate ("MVTR") of less than about 1000 (g·mil)/(100 in²·day), preferably less than about 750 (g·mil)/(100 in²·day), more preferably less than about 500 (g·mil)/(100 in²·day).

In an embodiment where the golf equipment includes a golf ball or a portion thereof, the method according to the invention further includes optionally adding from about 0.1% to 50% by weight of a filler material. Adding this filler material may alter the specific gravity or other mechanical, physical, optical, or processing properties of the golf ball or the portion thereof.

In another embodiment, the method further includes adding to one or more of the reactable components a catalyst to facilitate or speed up the reaction between the at least two reactable components when they are combined. Preferably, the catalyst is present in an amount from about 0.001% to 3% by weight and includes a metal catalyst, preferably a tin catalyst, an amine catalyst, an organic acid, a delayed catalyst, or a combination thereof.

Another aspect of the invention relates to golf equipment, preferably golf balls, or a portion thereof, prepared by any of the processes detailed herein. For example, the invention includes golf equipment, or a portion thereof, including: a first reactable component comprising an isocyanate-containing compound; and a second reactable component comprising at least one of a polyol, polyamine, or epoxy-containing compound, wherein the golf equipment, or portion thereof, is formed by reaction injection molding of the first and second reactable components, which react with each other after contact sufficiently to be substantially gelled or solidified within about 60 seconds, and wherein the isocyanate-containing compound contains: a diisocyanate having the generic structure, O=C=N—R—N=C=O, where R is a moiety containing from about 1 to 20 carbon atoms, optionally including one or more substituted or unsubstituted phenyl or cyclic groups; a dimeric or multimeric adduct of a diisocyanate; a triisocyanate or higher functional polyisocyanate that is not an adduct of a diisocyanate; or a mixture thereof.

BRIEF DESCRIPTION OF THE DRAWINGS

Further features and advantages of the invention can be ascertained from the following detailed description that is provided in connection with the drawings described below.

Figure 1:
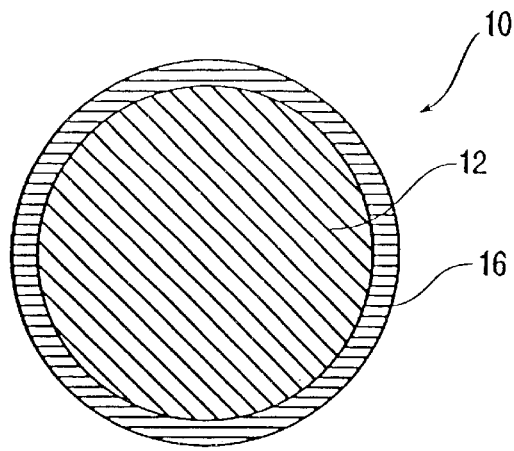
FIG. 1 illustrates a golf ball including a center and a cover layer disposed over the center, in which at least one of the center or the cover layer includes a reaction injection molded material according to the invention.

These FIGS. are not necessarily drawn to scale.

DEFINITIONS

As used herein, the term "golf equipment" includes any type of equipment used in connection with golf, including, but not limited to, golf balls; golf clubs (e.g., putters, drivers, and wedges) and club attachments, additions, or modifications, such as striking face inserts; golf club components (e.g., shafts, hosels, and grips); golf club vibration damping devices; golf gloves; golf shoes; and any portion of the above items.

As used herein, the phrase "substantial gelation or solidification" refers generally to viscosity increases sufficient to prevent or substantially retard flow of a material into a mold or cavity or through an orifice.

The term "catalyst," as used herein, should be understood by one of ordinary skill in the art to include only those compounds which facilitate, or increase the rate of, a particular reaction and which are not substantially consumed by themselves reacting with one or more of the necessary components of the particular reaction. For example, any compound containing an accessible and reactive amine, epoxy, or hydroxyl group that should readily react with an isocyanate group should be considered a reactable component (e.g., a curing agent) and not a catalyst.

As used herein, the term "fluid" includes a liquid, a paste, a gel, a gas, or any combination thereof. It should be understood that the term "fluid-filled," as used herein in reference to golf equipment or to a portion thereof, also includes the situation where the golf equipment, or the portion thereof, is hollow.

As used herein in reference to a golf ball, the term "core" represents the center and optional additional layer(s), such as an intermediate layer, which layer(s) is(are) disposed between the center and the cover of the golf ball.

The term "prepolymer," as used herein, refers to a material containing at least one isocyanate-containing component, and at least one isocyanate-reactive component, for example, such as a polyol, a polyamine, an epoxy-containing compound, and mixtures thereof.

The term "quasi-prepolymer," as used herein, refers to a subset of prepolymers in which the isocyanate content is at least about 13% of the weight of the prepolymer. Where prepolymers are mentioned herein, it should be understood that this includes prepolymers having an isocyanate content less than about 13% by weight and also includes quasi-prepolymers.

The term "polyol," as used herein, refers to a compound containing at least 2 hydroxyl groups, regardless of its molecular weight. The term "polyamine," as used herein, refers to a compound containing at least 2 primary or secondary amine groups, regardless of molecular weight.

The term "viscosity index," as used herein, refers to the ratio of viscosities between two components. As should be understood by one of ordinary skill in the art, solid components generally do not have a measurable viscosity.

The term "substantially," as used herein referring to an amount or condition, means at least about 80%, preferably at least about 90%, more preferably at least about 95%, most preferably at least about 99% of the amount or condition.

The term "about," as used herein before a range of values, should be understood to modify either or both of the values in the range.

As used herein with regard to golf ball properties, the term "compression" refers to Atti compression, which is defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball. When the Atti Gauge is used to measure cores having a diameter of less than 1.680 inches, it should be understood that a metallic or other suitable shim is used to make the measured object 1.680 inches in diameter.

DETAILED DESCRIPTION OF THE PREFERRED EMBODIMENTS

The invention relates to a method for forming golf equipment, or a portion thereof, in particular for forming one or more layers of a golf ball, including: providing a first reactable component including a polyisocyanate or including a prepolymer or quasi-prepolymer containing the reaction product of a polyol, polyamine, or epoxy-containing compound with at least one polyisocyanate, and a second reactable component including at least one of a polyol, polyamine, or epoxy-containing compound; mixing the reactable components together to form a reactive mixture; and injecting the reactive mixture into a cavity or mold having a desired shape within a time sufficient to avoid substantial gelation or solidification. Advantageously, the polymerization, solidification, or gelation times of the reactive mixture of the present invention should typically not be more than about 60 seconds, preferably not more than about 45 seconds, more preferably from about 0.25 seconds to 30 seconds, most preferably from about 0.5 seconds to 15 seconds, all at ambient or elevated temperatures. In various other embodiments, the polymerization, solidification, or gelation times of the reactive mixture of the present invention are from about 1 second to 10 seconds or from about 1 second to 5 seconds. In particular, reaction injection molding can be used to form a core layer, intermediate layer, cover layer, or any portion or combination of layers thereof.

Reaction injection molding ("RIM") according to the invention includes any injection molding process in which two or more components are reactive upon contact and/or addition into a mold cavity. The invention further includes several different sub-types of reaction injection molding, e.g., such as liquid injection molding ("LIM"), reinforced reaction injection molding ("RRIM"), and structural reaction injection molding ("SRIM"). Liquid injection molding occurs when the two or more components are in liquid form and includes subclasses micro-LIM and nano-LIM, which refer to smaller and much smaller injection volumes, respectively, as compared to most commercial processes. Reinforced RIM occurs with one or more filler materials being added to the two or more components prior to injection into the mold cavity. Structural RIM occurs where there is a preform around which the two or more components are injected within the mold cavity. The preform is generally in fiber or mesh form but may be made from any material sufficient to substantially withstand the injection pressures typically associated with the RIM process. In SRIM, a composite material is typically formed.

In a preferred embodiment, each of the first and second reactable components have a viscosity not more than about 20,000 cPs, preferably not more than about 15,000 cPs, more preferably from about 25 cPs to 10,000 cPs, most preferably from about 25 cPs to 5,000 cPs, until the reactable components are mixed together or the reactive mixture is injected into the cavity or mold. In another preferred embodiment, all the reactable components, or mixtures thereof, that can be contacted to form the reactive mixture have viscosities similar to those of the first and second reactable components. In yet another preferred embodiment, each reactable component has a viscosity not more than about 5,000 cPs at a temperature of about 150° F. In one embodiment, the mixture is injected into the mold or cavity at an injection pressure of not more than about 2,500 psi.

These polymerization, solidification, or gelation times, as well as the viscosities of the reactable components, are applicable at ambient temperature (i.e., about 20° C. to 30° C.) or at elevated temperatures, for example, such as those at which the reactable components are separately contained or those at which the reactive mixture is injected. Preferably, when the polymerization, solidification, or gelation times, or the viscosities of the reactable components, are applied at elevated temperatures, the elevated temperature is typically the temperature at which the reactive mixture is injected.

The first, or isocyanate-containing, reactable component can include any isocyanate-functional monomer, or a dimeric or multimeric adduct thereof, prepolymer, quasi-prepolymer, or mixture thereof. The isocyanate-functional compounds may include monoisocyanates or polyisocyanates, which include any isocyanate functionality of 2 or more. Any polyisocyanate available to one of ordinary skill in the art is suitable for use according to the invention. Suitable isocyanate-containing components include diisocyanates having the generic structure:

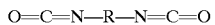

where R is preferably a cyclic, aromatic, or linear or branched hydrocarbon moiety containing from about 1 to 20 carbon atoms. The diisocyanate may also contain one or more phenyl groups or one or more cyclic groups. When multiple aromatic or cyclic groups are present, linear and/or branched hydrocarbons containing from about 1 to 10 carbon atoms can be present as spacers between the aromatic or cyclic groups. In some cases, the cyclic or aromatic group(s) may be substituted at the 2-, 3-, and/or 4-positions, or at the ortho-, meta-, and/or para-positions, respectively. Substituted groups may include, but are not limited to, halogens; primary, secondary, or tertiary hydrocarbon groups; or a mixture thereof. Other suitable isocyanate-containing compounds or the polyisocyanates include higher functional adducts of the above diisocyanates, as well as triisocyanates and higher functional isocyanates that are not adducts of diisocyanates, and mixtures thereof. Exemplary polyisocyanates include, but are not limited to, straight or branched aliphatic diisocyanates containing from about 2 to 40 carbons, for example, such as ethylene diisocyanate, propylene isocyanates (e.g., such as propylene-1,2-diisocyanate), tetramethylene isocyanates (e.g., such as tetramethylene-1, 4-diisocyanate), hexamethylene diisocyanates (e.g., such as 1,6-hexamethylene diisocyanate ("HDI"), 2,2,4-trimethylhexamethylene diisocyanate ("TMDI"), and the like), dodecane-1,12-diisocyanate, 2,2,4-trimethylhexamethylene diisocyanate, 4,4'-dicyclohexylmethane diisocyanate ("$H_{12}$MDI"), 2,4,4-trimethylene diisocyanate, and the like; diisocyanates containing cyclic groups, for example, such as cyclobutane-1,3-diisocyanate, cyclohexyl diisocyanates (e.g., such as cyclohexane-1,3-diisocyanate, cyclohexane-1,4-diisocyanate, methyl cyclohexylene diisocyanate ("$H_6$XDI"), 1-isocyanato-3,3,5-trimethyl-5-isocyanatomethyl cyclohexane, isophorone diisocyanate ("IPDI"), and the like); diisocyanates containing aromatic groups, for example, such as 4,4'-diphenylmethane diisocyanate ("MDI"), polymeric MDI, carbodiimide-modified liquid MDI, p-phenylene diisocyanate ("PPDI"), m-phenylene diisocyanate ("MPDI"), toluene diisocyanate ("TDI"), 3,3'-dimethyl-4,4'-biphenylene diisocyanate ("TODI"), naphthalene diisocyanate ("NDI"), xylylene diisocyanate ("XDI"), para-tetramethylxylylene diisocyanate ("p-TMXDI"), meta-tetramethylxylylene diisocyanate ("m-TMXDI"), tetracene diisocyanate, napthalene diisocyanate, anthracene diisocyanate, and the like; trimerized isocyanurates of any polyisocyanate or mixtures thereof, for example, such as the isocyanurate of TDI, the isocyanurate of a hexamethylene diisocyanate, and the like; dimerized uretdiones of any polyisocyanate or mixtures thereof, for example, such as the uretdione of TDI, the uretdione of a hexamethylene diisocyanate (e.g., such as HDI and the like), and the like; and mixtures thereof. Polyisocyanates are known to those of ordinary skill in the art as having more than one isocyanate group, e.g., di-, tri-, and tetra-isocyanate. Preferably, the polyisocyanate includes MDI, PPDI, MPDI, TDI, or a mixture thereof. In one preferred embodiment, the polyisocyanate includes MDI. In one embodiment, the polyisocyanate is completely free of m-TMXDI. It should be understood that, as used herein, the term "MDI" includes 4,4'-diphenylmethane diisocyanate, polymeric MDI, carbodiimide-modified liquid MDI, and mixtures thereof.

Typically, the amount of the isocyanate-containing reactable component is determined in relation to the amount of the second reactable component present in the reactive mixture. In one preferred embodiment, the ratio of the first isocyanate-containing reactable component to the second, or isocyanate-reactive, reactable component is typically from about 0.02:1 to 10:1, preferably from about 2:1 to 1:2, more preferably from about 1.5:1 to 1:1.5, most preferably from about 1.1:1 to 1:1.1.

In one embodiment, the first isocyanate-containing reactable component should have less than about 14% by weight unreacted NCO groups, based on the weight of the isocyanate-containing reactable component. In another embodiment, the first isocyanate-containing reactable component has no greater than about 7.5%, more preferably from about 2.5% to 7.5%, and most preferably from about 4% to 6.5% by weight unreacted NCO groups, based on the weight of the first isocyanate-containing reactable component. In yet another embodiment, the first isocyanate-containing reactable component should have greater than about 14% by weight unreacted NCO groups, based on the weight of the isocyanate-containing reactable component.

The first isocyanate-containing reactable component employed may be "low free monomer," understood by one of ordinary skill in the art to have lower levels of "free" monomer isocyanate groups, typically less than about 0.1% free isocyanate-containing monomer groups. Typically, polymer products containing low free monomer isocyanates are less toxic, exhibit improved elastomeric properties, and/or result in a more uniform polymer. Examples of "low free monomer" isocyanates include, but are not limited to, Low Free Monomer MDI, Low Free Monomer TDI, and Low Free Monomer PPDI, as well as mixtures thereof.

Preferably, the second reactable component includes at least one polyamine, polyol, epoxy-containing compound, or a mixture thereof. In one preferred embodiment, the second reactable component includes at least one polyamine. Suitable polyamines include, but are not limited to, tetrahydroxypropylene ethylenediamine; 3,5-dimethylthio-2,4-toluenediamine and isomers thereof, for example, such as 3,5-dimethylthio-2,6-toluenediamine or ETHACURE™ 300, commercially available from Albermarle Corporation of Baton Rouge, La.; 3,5-diethyltoluene-2,4-diamine and isomers thereof, such as 3,5-diethyltoluene-2,6-diamine; 1,4-bis-(sec-butylamino)-benzene and isomers thereof, for example, such as 1,2-bis-(sec-butylamino)-benzene; 1,2-bis-(sec-butylamino)-cyclohexane and isomers thereof, for example, such as 1,4-bis-(sec-butylamino)-cyclohexane; 4,4'-bis-(sec-butylamino)-diphenylmethane and derivatives thereof; 4,4'-bis-(sec-butylamino)-dicyclohexylmethane and derivatives thereof; trimethylene glycol di-p-aminobenzoate; polytetramethyleneoxide-di-p-aminobenzoate; N,N'-dialkyldiamino diphenyl methane; p,p'-methylene dianiline ("MDA"); m-phenylenediamine ("MPDA"); 4,4'-methylene-bis-(2-chloroaniline) ("MOCA"); 4,4'-methylene-bis-(2,6-diethylaniline); 4,4'-methylene-bis-(3-chloro-2,6-diethylaniline); 4,4'-diamino-3,3'-diethyl-5,5'-dimethyl diphenylmethane; 2,2',3,3'-tetrachloro-diamino diphenylmethane; 4,4'-dicyclohexylmethane diamine; m- or p-phenylenediamine; 1,4-cyclohexyl-bis-(methylamine) and isomers thereof, for example, such as 1,4-cyclohexyl-bis-(methylamine); 2-methylpenatmethylene diamine; diaminocyclohexane; tri-isopropanolamine; diethylene triamine; triethylamine tetramine; tetraethylene pentamine; isomers of propylenediamine, for example, such as 1,3-propylenediamine; dialkylaminopropylamines, for example, such as dimethylaminopropylamine, diethylaminopropylamine, and the like, and mixtures thereof; imido-bis-propylamine; diethanolamine; triethanolamine; diisopropanolamine; isophoronediamine; and mixtures thereof. Suitable polyamines, which can include both primary and secondary amines, preferably have molecular weights ranging from about 64 to 4,000 g/mol.

Other suitable polyamines include those having the general formula:

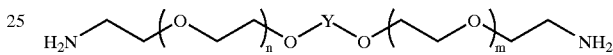

where n and m each separately have values of 0, 1, 2, or 3, and where Y is preferably 1,2-cyclohexyl, 1,3-cyclohexyl, 1,4-cyclohexyl, o-, m-, or p-phenylene, or the like, or a combination thereof. Preferably, n and m each separately have values of 0, 1, or 2, more preferably 1 or 2.

In an alternate preferred embodiment, the second reactable component includes a polyol. Any polyol, or mixture thereof, available to one of ordinary skill in the art is suitable for use according to the invention. In a more preferred embodiment, the polyol includes ethylene glycol; diethylene glycol; propylene glycol; dipropylene glycol; a polyether polyol, for example, such as polyethylene glycol, polypropylene glycol, polytetramethylene ether glycol ($M_n \leq$ about 4,000 g/mol), and the like, and mixtures thereof; 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,3-butanediol and isomers thereof, for example, such as 1,4-butanediol, 2,3-butanediol, and the like, and mixtures thereof; 1,5-pentanediol; 1,6-hexanediol; ortho-phthalate-1,6-hexanediol; resorcinol-di-(β-hydroxyethyl)ether and its derivatives; hydroquinone-di-(β-hydroxyethyl)ether and its derivatives; trimethylol propane; hydroxy-terminated polybutadiene (including partially/fully hydrogenated derivatives); a polyester polyol, for example, such as a polycaprolactone polyol; polycarbonate polyol; or a mixture thereof.

When the polyol includes a polyether polyol, preferably those polyols that have the generic structure:

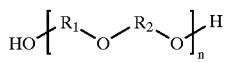

where $R_1$ and $R_2$ are straight or branched hydrocarbon chains, each containing from 1 to about 20 carbon atoms, and n ranges from 1 to about 45. Examples include, but are not limited to, polytetramethylene ether glycol ("PTMEG"), polyoxyethylene glycol ("PEG"), polyoxypropylene glycol ("PPG"), poly(oxyethylene-oxypropylene)glycol copolymers, and mixtures and copolymers thereof. The hydrocarbon chain can have saturated or unsaturated bonds and substituted or unsubstituted aromatic and cyclic groups. In a preferred embodiment, the polyol of the present invention includes PTMEG.

When polyester polyols are included in the polyurethane material of the invention, preferably those polyols that have the generic structure:

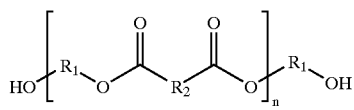

where $R_1$ and $R_2$ are straight or branched hydrocarbon chains, each containing from 1 to about 20 carbon atoms, and n ranges from 1 to about 25. Suitable polyester polyols include, but are not limited to, polyethylene adipate glycol, polypropylene adipate glycol, polybutylene adipate glycol, poly(ethylene adipate-propylene adipate)glycol, poly(hexamethylene adipate)glycol, and mixtures and copolymers thereof. The hydrocarbon chain can have saturated or unsaturated bonds, or substituted or unsubstituted aromatic and cyclic groups.

In an alternate preferred embodiment, the polyester polyol can include a polycyclic ester polyol, for example, such as a polycaprolactone polyol. When polycaprolactone polyols are included in the materials of the invention, preferably those polyols that have the generic structure:

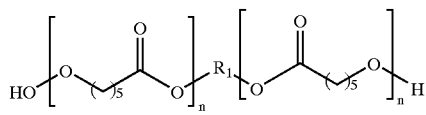

where $R_1$ is preferably a straight chain or branched hydrocarbon chain containing from 1 to about 20 carbon atoms, and where n is the chain length and ranges from 1 to about 20. Suitable polycaprolactone polyols include, but are not limited to, 1,6-hexanediol-initiated polycaprolactone, diethylene glycol-initiated polycaprolactone, trimethylol propane-initiated polycaprolactone, neopentyl glycol-initiated polycaprolactone, 1,4-butanediol-initiated polycaprolactone, PTMEG-initiated polycaprolactone, and mixtures thereof. The hydrocarbon chain can have saturated or unsaturated bonds, or substituted or unsubstituted aromatic and cyclic groups.

When polycarbonate polyols are included in the polyurethane material of the invention, preferably those polyols that have the generic structure:

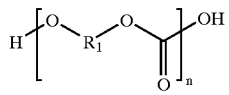

where $R_1$ can include a hydrocarbon chain, which may have saturated or unsaturated bonds or substituted or unsubstituted aromatic or cyclic groups (e.g., in one preferred embodiment, $R_1$ includes predominantly bisphenol A units -(p-$C_6H_4$)—C($CH_3$)$_2$-(p-$C_6H_4$)- or derivatives thereof), and where the chain length, n, ranges from 1 to about 20. Suitable polycarbonates include, but are not limited to, poly(phthalate carbonate)glycol, poly(hexamethylene carbonate)glycol, polycarbonate glycols containing bisphenol A, or mixtures or copolymers thereof.

Other suitable polyols have the following general chemical structure:

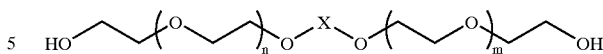

where n and m each separately have values of 0, 1, 2, or 3, and where X is o-phenylene, m-phenylene, p-phenylene, 1,2-cyclohexyl, 1,3-cyclohexyl, or 1,4-cyclohexyl, or mixtures thereof. Preferably, n and m each separately have values of 0, 1, or 2, and more preferably, 1 or 2.

In one embodiment, the second reactable component contains a compound having a molecular weight of at least about 400 g/mol, alternately from about 200 g/mol to about 4000 g/mol. In another embodiment, the second reactable component contains a compound having a molecular weight of not more than about 400 g/mol, alternately from about 18 g/mol to 600 g/mol. In a preferred embodiment, the second reactable component contains at least two compounds, a first compound having a molecular weight of not less than about 400 g/mol, alternately from about 200 g/mol to about 4000 g/mol, and a second compound having a molecular weight of not more than about 400 g/mol, alternately from about 18 g/mol to 600 g/mol. It should be understood that molecular weight, as used herein, is the absolute number average molecular weight and would be understood as such by one of ordinary skill in the art.

Generally, when the second reactable component contains a compound whose molecular weight is not less than about 400 g/mol, this reactable component is considered the "soft segment" of the resulting polymer material. Preferably, the soft segment is present in an amount from about 40% to 95%, preferably from about 50% to 90%, more preferably from about 60% to 85%, based on the total weight of the polymer.

Epoxy-containing compounds according to the present invention have the general formula:

wherein $R_1$ and $R_2$ can be the same or different and each represent a hydrogen atom or an organic group including linear and branched chain alkyl, aryl, hydrocarbyloxy, and carbocyclic groups, and mixtures thereof. In a preferred embodiment, both $R_1$ and $R_2$ are generally not hydrogen atoms.

As used herein, the phrase linear chain or branched chained alkyl groups of up to about 30 carbon atoms means any substituted or unsubstituted acyclic carbon-containing compounds. Examples of alkyl groups include lower alkyl, for example, methyl, ethyl, n-propyl, iso-propyl, n-butyl, iso-butyl or tert-butyl; and upper alkyl, for example, In addition, such alkyl group may also contain various substituents in which one or more hydrogen atoms has been replaced by a functional group. Functional groups include but are not limited to hydroxyl, amino, carboxyl, amide, ester, ether, halogen (fluorine, chlorine, bromine and iodine), siloxanes, and sulfonic amides to mention but a few.

As used herein, substituted and unsubstituted carbocyclic groups of up to about 20 carbon atoms means cyclic carbon-containing compounds, including but not limited to cyclopentyl, cyclohexyl, and a combination thereof.

A preferred class of epoxy-containing compounds for the present invention includes organic compounds having two epoxy groups as shown in the formula below:

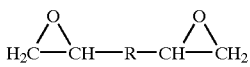

wherein R is defined as for $R_1$ and $R_2$ above.

The most preferred diepoxy compound for use in the second reactive component of the present invention is (2,2-bis[4-(2'3'epoxy propoxy)phenyl]propane), commonly called the diglycidyl ether of bisphenol A (DGEBA) and having the following formula:

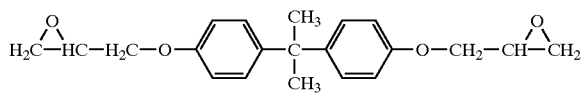

The other curing agents, related to DGEBA may also be used in the present invention. The higher molecular weight homologs are represented by the following theoretical structure having the following formula:

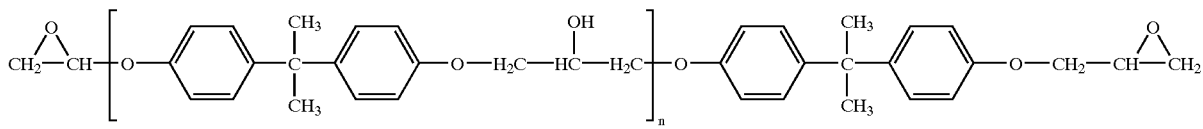

Typical values of n can be from 0.5 to about 2.5 and is about 0.15 for D.E.R. 331 epoxy resin (epoxy equivalent weight range of about 182 to 192 and viscosity of 11,000–14,000 cps). The low melting point solid resins begin at an "n" of about 2.5. In high melting point solid resins, n may be as high as 18.

Other organic compounds having at least one epoxy group which, according to the claimed invention, can be used in one of the reactable components include the epoxy-novolac resins under the trade name D.E.N. (400 series), such as D.E.N. 431, D.E.N. 438 and D.E.N. 439, available from Dow Chemical Co. Further, low viscosity polyglycol epoxy resins under the trade name D.E.R. (700 series), including D.E.R. 732 and D.E.R. 736 may also be used. Also, the EPON™ class of epoxy resin available from SHELL can also be used in the golf equipment or methods according to the present invention.

The polyols, polyamines, and epoxy-containing compounds can include one or more saturated, unsaturated, aromatic, and cyclic groups. Additionally, the polyols, polyamines, and epoxy-containing compounds can include one or more halogen groups. Also, a single polyol, polyamine, or epoxy-containing compound may be used, as well as a blend or mixture thereof.

In some embodiments, catalysts may optionally be used to accelerate or facilitate the reaction between the isocyanate-containing component and the isocyanate-reactive component, e.g., the polyol, polyamine, or epoxy-containing component. The catalyst may be contained separately from all other components or may be added to one or more other components to form a mixture. In one embodiment, the catalyst is added to the isocyanate-containing component. In another embodiment, the catalyst is added to the isocyanate-reactive component. Suitable catalysts include, but are not limited to, tin catalysts, for example, such as dibutyltin dilaurate; amine catalysts, for example, a trialkylamine such as triethylenediamine, triethylamine, tributylamine, or a mixture thereof, organic acids, for example, such as acetic acid, oleic acid, or a mixture thereof; delayed catalysts, for example, such as POLYCAT™ SA-1, POLYCAT™ SA-102, and the like, or a mixture thereof; or combinations thereof. When a catalyst is present, it is added in an amount sufficient to catalyze or facilitate the reaction of the components in the reactive mixture, preferably in an amount from about 0.001% to 3%, based on the total weight of the first and second reactable components.

Fillers added to one or more layers of the golf equipment, e.g., a golf ball, typically include processing aids or compounds to affect rheological and mixing properties, the specific gravity (i.e., density-modifying fillers), the modulus, the tear strength, reinforcement, and the like. A density adjusting filler may be used to control the moment of inertia, and thus the initial spin rate of the ball and spin decay. Fillers are typically polymeric or inorganic in nature, and, when used, are typically present in an amount from about 0.1 to 50 weight percent of the layer or portion in which they are included. Any suitable filler available to one of ordinary skill in the art may be used. Exemplary fillers include, but are not limited to, precipitated hydrated silica; clay; talc; glass fibers; aramid fibers; mica; calcium metasilicate; barium sulfate; zinc sulfide; lithopone; silicates; silicon carbide; diatomaceous earth; carbonates such as calcium carbonate and magnesium carbonate; metals such as titanium, tungsten, aluminum, bismuth, nickel, molybdenum, iron, copper, boron, cobalt, beryllium, zinc, and tin; metal alloys such as steel, brass, bronze, boron carbide whiskers, and tungsten carbide whiskers; metal oxides such as zinc oxide, iron oxide, aluminum oxide, titanium oxide, magnesium oxide, and zirconium oxide; particulate carbonaceous materials such as graphite, carbon black, cotton flock, natural bitumen, and cellulose flock; micro balloons such as glass and ceramic; fly ash; cured, ground rubber; or combinations thereof.

Other additive ingredients such as accelerators, e.g., tetra methylthiuram, processing aids, processing oils, plasticizers, colorants, e.g., dyes and pigments, as well as other additives well known to the ordinary-skilled artisan may also be used in the present invention in amounts sufficient to achieve the purpose for which they are typically used.

In an alternate embodiment, each component may include at least two sets of precursor components that can be reacted to form at least two different polymers of an interpenetrating polymer network, at least one polymer being crosslinked. In addition, if any of the at least two component sets include a mixture of precursor components, then that mixture must be sufficiently non-reactive such that the sets of precursor components, when placed in contact wit each other, can still form an interpenetrating polymer network (IPN). Some interpenetrating polymer networks form so quickly as to necessitate formation by a reaction injection molding (RIM) method according to the invention. Additional descriptions of IPN compositions useful for golf equipment, or components thereof, according to the invention include those described in co-pending U.S. pat. application Ser. No. 09/833,667, filed on Apr. 13, 2001, entitled "Golf Balls Containing Interpenetrating Polymer Networks," the disclosure of which is incorporated herein by express reference thereto.

In one embodiment, the golf equipment of the present invention may optionally include a foamed material. This foamed material may advantageously be made using the materials of the invention, as detailed herein. Suitable components of the foamed material may include those described in co-pending U.S. patent application Ser. No. 09/565,108, filed on May 4, 2000, the entire disclosure of which is incorporated herein by reference hereto, although the foamed material will be processed by a method according to the present invention. For example, an IPN can be foamed and used to form golf equipment, or a portion thereof. In addition, when the golf equipment of the invention includes a foamed material, the curing agent components may also include water.

When the golf equipment includes a foamed layer or portion, the foamed layer or portion may be an open-cell, a closed-cell, or a microcellular foam; the components may also include various foaming agents or blowing agents which may be readily selected by one of ordinary skill in the art, or which may include, but are not limited to, non-reactive gases, for example, such as freon, nitrogen, helium, carbon dioxide, or the like, or combinations thereof. Foamed materials may also include microspheres added in with one or more of the components. Polymeric, ceramic, metal, and glass microspheres may be solid or hollow, and filled or unfilled. Particularly suitable microcellular materials include those described in co-pending U.S. patent application Ser. No. 09/565,108, filed on May 4, 2000, previously incorporated herein by reference. In a preferred embodiment, the foamed layer or portion has a specific gravity of not more than about 1, more preferably not more than about 0.8, most preferably not more than 0.5.

In one embodiment, the golf equipment made according to the invention, or a portion thereof, has a thickness less than about 0.065 inches, alternately less than 0.01 inches. In particular, a layer of a golf ball, such as the cover, or a coating on a golf club face, can be prepared with the reaction injection molded material of the invention.

When the golf equipment is a golf ball, the center of the golf ball may be fluid-filled. The fluid-filled golf ball may advantageously contain a fluid, for example, as disclosed in co-pending U.S. application Ser. No. 09/496,353, filed Feb. 2, 2000, the entire disclosure of which is incorporated herein by reference hereto, which fluid may also possess some or all the properties detailed therein, e.g., such as fluid water activity, center fluid content, density, or specific gravity, or the like, or a combination thereof. The core of the golf ball may also be wound or non-wound.

Additionally, when butadiene rubber is used in one or more layers of the golf equipment, typically of golf balls, prepared according to the present invention, the uncured rubber typically has a Mooney viscosity greater than about 20, preferably greater than about 30, and more preferably greater than about 40. In one embodiment, the Mooney viscosity is about 40 to 60. Mooney viscosity is typically measured according to ASTM D1646-99. Such materials can preferably be included in one or more core layers.

In another embodiment, the moisture vapor transmission rate (MVTR) or fluid permeation rate of a layer or coating of the gelled or solidified reactive mixture is typically less than about 1,000 (g·mil)/(100 in$^2$·day), preferably less than about 750 (g·mil)/(100 in$^2$·day), more preferably less than about 500 (g·mil)/(100 in$^2$·day). For comparison purposes, it is desirable to test samples having a thickness of approximately 0.02 inches (20 mils) to relatively assess permeation or MVTR values.

Also when the golf equipment contains multiple layers, for example, such as in a multi-layer golf ball, a surface treatment between any two layers may be effected to improve the adhesion between those layers. The surface treatment may include mechanical abrasion, e.g., such as sandblasting; plasma treatment, including treatment at atmospheric pressure; corona treatment; flame treatment; wet chemical surface modification; application of adhesives or adhesion promoters, e.g., such as those available commercially as EASTMAN 343-1, EASTMAN 343-3, EASTMAN 515-2 (all from Eastman Chemical Co. of Kingsport, Tenn.), BAYER 8173, BAYER U42, BAYER U53, BAYER 140AQ (all from Bayer Corp. of Pittsburgh, Pa.), RICOBOND (from Ricon Resins, Inc. of Grand Junction, Colo.), WITCOBOND (from Witco Corp. of Greenwich Conn.), or the like, or a combination thereof. Advantageously, the surface treatment may be effected as recited in co-pending U.S. application Ser. No. 09/389,058, filed on Sep. 2, 1999, the entire disclosure of which is incorporated herein by reference hereto.

When the golf equipment includes golf balls, the resultant golf balls prepared according to the invention typically will typically have dimple coverage greater than about 60 percent, preferably greater than about 65 percent, and more preferably greater than about 70 percent. Optionally, the golf balls also have a cover material hardness from about 15 Shore A to 85 Shore D, or a flexural modulus (measured according to ASTM D6272-98) of greater than about 500 psi (3.4 MPa). In some cases, the flexural modulus of the reaction injection molded golf equipment, or portion thereof, can be less than about 5,000 psi (34 MPa). In other cases, the flexural modulus of the reaction injection molded golf equipment, or portion thereof, can be less than about 300,000 psi (2.1 GPa). The golf balls also typically have a coefficient of restitution of greater than about 0.7, preferably greater than about 0.75, and more preferably greater than about 0.78, at an initial velocity of 125 ft/s. The golf balls also typically have an Atti compression of at least about 40, preferably from about 50 to 120, more preferably from about 60 to 100.

When the golf equipment is a golf ball, the golf ball construction may be such that it has "high spin" or "low spin" characteristics. In an embodiment when the golf balls according to the invention include more than one cover layer, the golf ball will typically include an outer cover layer having a first material hardness and another layer beneath the outer cover layer, be it an inner cover layer or an intermediate layer, having a second material hardness. In one embodiment, the first material hardness is greater than the second material hardness, wherein the golf ball is then typically characterized as a "low spin" ball, and the ball has lower spin when struck by a driver than the "high spin" embodiment. In an alternate embodiment, the first material hardness may be at least about 55 Shore D, or the second material hardness may be up to about 55 Shore D. In another embodiment, the second material hardness is greater than the first material hardness, wherein the golf ball is then typically characterized as a "high spin" ball, and the ball has higher spin when struck by a driver than the "low spin" embodiment. In an alternate embodiment, the second material hardness may be at least about 55 Shore D, or the first material hardness may be up to about 55 Shore D.

In yet another embodiment, both the first and the second material hardness are above about 55 Shore D. In still another embodiment, both the first and the second material hardness are below about 60 Shore D. All such hardnesses are measured on the material preferably using ASTM D2240-00.

Depending on the desired properties, golf equipment, primarily golf balls, prepared according to the invention can exhibit substantially the same or higher resilience, or coefficient of restitution ("COR"), with a decrease in compression or modulus, compared to equipment of conventional construction. Additionally, golf equipment prepared according to the invention can also exhibit substantially higher resilience, or COR, without an increase in compression, compared to equipment of conventional construction. Another measure of this resilience is the loss tangent, or tan δ, which is obtained when measuring the dynamic stiffness of an object. Loss tangent and terminology relating to such dynamic properties is typically described according to ASTM D4092-90. Thus, for golf balls, a lower loss tangent indicates a higher resiliency, thereby indicating a higher rebound capacity. Low loss tangent indicates that most of the energy imparted to a golf ball from the club is converted to dynamic energy, i.e., launch velocity and resulting longer distance. The rigidity or compressive stiffness of a golf ball may be measured, for example, by the dynamic stiffness. A higher dynamic stiffness indicates a higher compressive stiffness. To produce golf balls having a desirable compressive stiffness, the dynamic stiffness of the crosslinked polybutadiene reaction product can be less than about 50,000 N/m at about −50° C. In one preferred embodiment, the dynamic stiffness can be from about 10,000 N/m to 40,000 N/m at about −50° C., more preferably from about 20,000 N/m to 30,000 N/m at about −50° C.

The dynamic stiffness is similar in some ways to dynamic modulus. Dynamic stiffness is dependent on probe geometry as described herein, whereas dynamic modulus is a unique material property, independent of geometry. The dynamic stiffness measurement has the unique attribute of enabling quantitative measurement of dynamic modulus and exact measurement of loss tangent at discrete points within a sample article. In the case of this invention, the article is at least a portion of a golf ball core. The polybutadiene reaction product preferably has a loss tangent below about 0.1 at about −50° C., and more preferably below about 0.07 at about −50° C.

As is well known to those of ordinary skill in the art, the time-temperature superposition principle may be used to emulate alternative deformation rates. Particularly for golf ball portions including polybutadiene, a 1-Hz oscillation at temperatures between about 0° C. and −50° C. are believed to be qualitatively equivalent to golf ball impact rates. Therefore, measurement of loss tangent and dynamic stiffness at about 0° C. to −50° C. may be used to accurately anticipate golf ball performance, preferably at temperatures from about −20° C. to −50° C.

The golf equipment, or the reaction injection molded portion thereof, e.g., a golf ball or golf ball layer, typically has a dynamic shear storage modulus of at least about $10^4$ dynes/cm$^2$, preferably from about $10^4$–$10^{10}$ dyn/cm$^2$, and more preferably from about $10^6$ to $10^8$ dyn/cm$^2$, when measured at about 23° C. and a frequency of 1 Hz. The reaction injection molded golf ball or golf ball layer also typically has a loss tangent no greater than about 1 at any temperature, preferably from about 0.01 to 0.5 at about 23° C., and more preferably from about 0.01 to 0.1 at about 23° C.

Another aspect of the invention relates to a grid scaffolding present in any portion of golf equipment that is below the outer surface. In the case of a golf ball, for example, the grid scaffolding may be present in any layer other than the outer cover layer (when more than one cover layer is present). The incorporation of this grid scaffolding in golf equipment according to the invention can advantageously improve performance properties or reduce the cost of manufacturing the golf equipment. For example, when the golf equipment is a golf ball, the presence of a grid scaffolding in one of the golf ball layers modifies at least one of the golf ball spin, feel, distance, or velocity. The modification of these golf ball properties may change with such characteristics as the density, the mechanical properties (e.g., compressive modulus, flexural modulus, strength, viscoelastic response, and the like), the thickness, the continuity, or the compatibility of the grid with the materials surrounding it. As a result, other properties or characteristics of the golf ball may be influenced, e.g., such as the moment of inertia, spin rate, ball weight, or the like, or combinations thereof. The grid scaffolding may be continuous or non-continuous, preferably non-continuous, and is typically symmetrical about a central mirror plane.

The grid scaffolding may also advantageously allow the material disposed above and beneath it to have an intermediate interface with which to interact. In addition, the discontinuities, e.g., gaps, if present, in the grid scaffolding may be filled with another material to allow the material disposed above and beneath it to have two intermediate interfaces with which to interact. Without being bound by theory, it is believed that the mechanical or structural integrity of the connection between the material disposed above and beneath the grid scaffolding may be desirably tailored to alter, for example, the properties of the golf equipment as a whole. In addition, the physical (or optionally chemical, if there is complementary functionality present) adhesion present between the grid scaffolding, the material disposed above and beneath, and optionally another material filled within the grid, may be effected without further adhesive, chemical, abrasive, or other treatment of the surfaces involved. It is believed that sufficient adhesion may occur because the surface area for contact between all the materials in such a composite can be increased by using such a grid scaffolding, as compared to adhesion between traditional layers. Additional treatments to increase adhesion of any of these components can, of course, be used if desired. In another embodiment, where the grid is continuous, adhesion and mechanical integrity can still be effected, although without another intermediate material.

The grid scaffolding according to the invention may be made by any appropriate manufacturing technique known to those of ordinary skill in the art. The cross-sectional shape or texture of the grid scaffolding may vary and can include a corrugated shell, preferably a bi-corrugated shell, a ribbed shell, a square-edged shell, or the like, or a combination thereof. The three-dimensional shape of the grid scaffolding can advantageously be tailored to the particular golf equipment in which it is incorporated. For example, the grid may be spherical or hemispherical for use in a golf ball, flat for use in a golf club head or a golf shoe sole, or cylindrical or frusto-conical for use in a golf club shaft, or the like.

Figure 2:
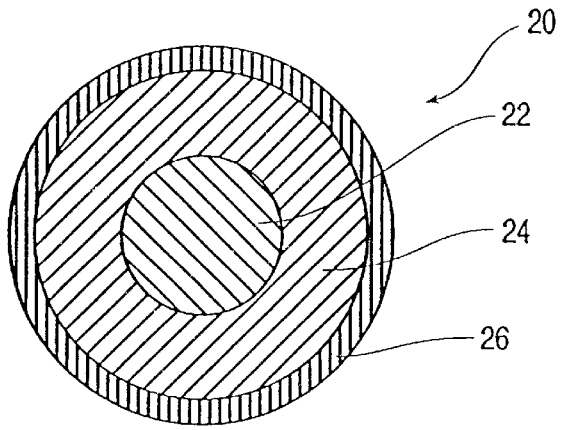
FIG. 2 illustrates a three-layer golf ball, in which at least one layer of the golf ball includes a reaction injection molded material according to the invention.
Figure 3:
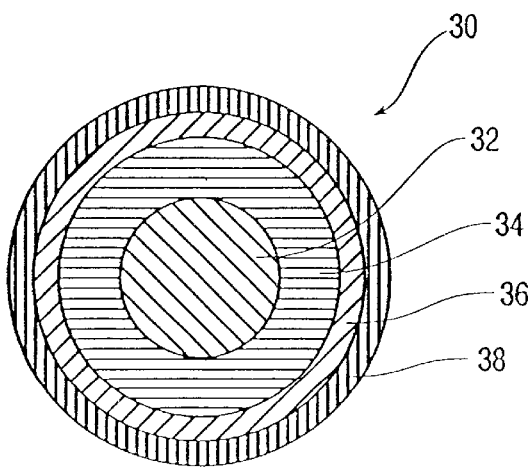
FIG. 3 illustrates a multi-layer golf ball, in which at least one layer of the golf ball includes a reaction injection molded material according to the invention.

Referring to FIG. 1, a golf ball 10 of the present invention can include a center 12 and a cover 16 surrounding the center 12. Referring to FIG. 2, a golf ball 20 of the present invention can include a center 22, a cover 26, and at least one intermediate, or intermediate, layer 24 disposed between the cover and the center. Each of the cover and center layers in FIGS. 1 or 2 may include more than one layer (not shown); i.e., the golf ball can be a conventional three-piece wound ball, a two-piece ball, a ball having a multi-layer core and an intermediate layer or layers, etc. Also, FIG. 3 shows a golf ball 30 of the present invention including a center 32, a cover 38, and two intermediate layers 34, 36 disposed therebetween. In another embodiment, the ball 30 illustrates a two part center 32,34, an intermediate layer 36, and a cover 38.

The two part center can include, for examples, two solid layers, a solid layer 32 and a wound layer 34 or grid 34 disposed about it, or a fluid-filled center 32 and a shell 34 to contain the fluid. Additionally, although FIGS. 1–3 show golf balls with only one cover layer, it will be appreciated that any number or type of cover layers may be used. In each of these FIGS. and embodiments, at least one layer includes a reaction injection molded material or is formed by reaction injection molding.

Figure 4:
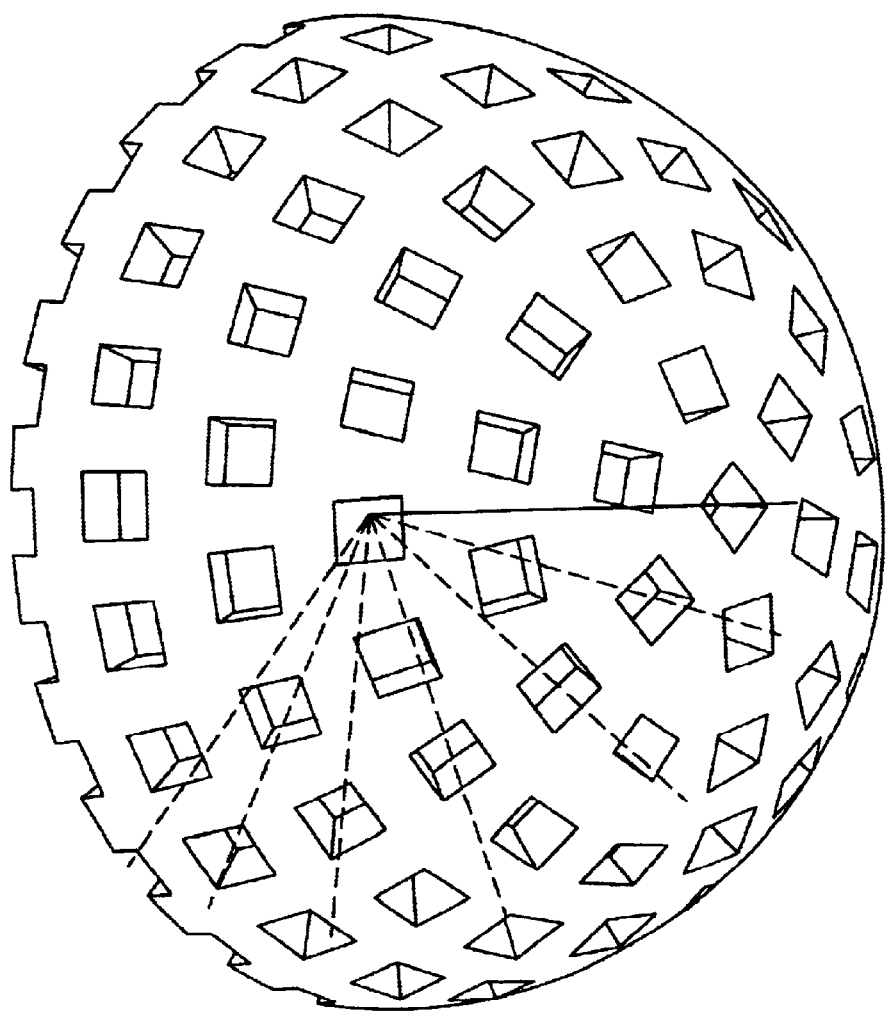
FIG. 4 illustrates a hemispherical grid scaffolding useful in forming a portion of an intermediate layer of a golf ball according to the invention.

Any one of the center, core, intermediate layers, or inner cover layers (not the outer cover layer, when more than one cover layer is present), may contain dual hemispheres of a grid scaffolding (i.e., thus forming a non-continuous spherical grid), one hemisphere of which is shown, for example, in FIG. 4. Alternately, one continuous spherical grid scaffolding may be used instead of a non-continuous grid formed from two opposing hemispherical scaffolds. In one embodiment, an intermediate or an inner cover layer (when more than one cover layer is present) of a multi-layer golf ball according to the invention contains dual hemispheres of this grid scaffolding. In this embodiment, the layer that contains this grid scaffolding (i.e., the grid layer), may also contain a polymeric material disposed about or beneath the dual hemispherical grid scaffolding. In a preferred embodiment, the polymeric material penetrates corrugations in the dual hemispheres of the grid scaffolding and is disposed about, through, and beneath the grid scaffolding in the grid layer.

EXAMPLES

The following examples are only representative of the methods and materials for use in golf ball compositions and golf balls of this invention, and are not to be construed as limiting the scope of the invention in any way.

Example 1

Polyurethane RIM Composition for Use in One or More Golf Ball Layers

| COMPONENTS | EQUIVALENTS |
|---|---|
| Quasi-Prepolymer | 1 |
| Polyol | 0.215 |
| Diamine | 0.735 |
| Organometallic Catalyst | 0.05% based on total of first three components |
| Tertiary Amine Catalyst | 0.05% based on total of first three components |
| Filler | 3.5% based on total of first three components |

The quasi-prepolymer of Example 1 is, in one embodiment, an aromatic diisocyanate-endcapped, 2,000-molecular-weight (number average) polyether glycol, more specifically an MDI/PTMEG quasi-prepolymer, e.g., such as one which has an isocyanate content of about 15.3% and is commercially available from Polyurethane Specialties Co., Inc., of Lyndhurst, N.J. The polyol of Example 1 is, in one embodiment, a polyether polyol, especially a polytetramethylene glycol, and has a number average molecular weight above about 400 g/mol, in one embodiment approximately 2,000 g/mol. The diamine can be any suitable diamine, in one embodiment being aromatic and liquid, e.g., such as ETHACURE™ 100, which commercially available from Albemarle Corp., of Baton Rouge, La. The organometallic catalyst is preferably dibutyltin dilaurate, e.g., such as DABCO® T-12, and the amine catalyst preferably includes a tertiary amine, e.g., such as DABCO® 33-LV, which is a 33% solution of triethylenediamine in dipropylene glycol, both of which catalyst examples are commercially available from Air Products & Chemicals, Inc., of Allentown, Pa. The filler is, in one embodiment, a white dispersion containing finely dispersed pigment in the form of a paste, e.g., such as in HCC-19584, which is commercially available from PolyOne of Massillion, Ohio.

The quasi-prepolymer is added to a first container separate from the polyol and diamine components, which are added to a second container. The two catalysts and the filler components may each be added to either container, although generally these three components will all be added to the second container along with the polyol and diamine components. The contents of the first container and second container are mixed and immediately injected into a mold cavity to form a layer of a golf ball, preferably a cover layer, more preferably the outer cover layer. Within about 60 seconds, at any temperature at or above ambient temperature, the layer is substantially polymerized and/or crosslinked to allow demolding of the golf ball, or portion thereof, containing a reaction-injection-molded layer.

It is to be understood that the invention is not to be limited to the exact configuration as illustrated and described herein. For example, it should be apparent that a variety of materials would be suitable for use in the composition or method of making the golf equipment according to the Detailed Description of the Preferred Embodiments. Accordingly, all expedient modifications readily attainable by one of ordinary skill in the art from the disclosure set forth herein, or by routine experimentation therefrom, are deemed to be within the spirit and scope of the invention as defined by the appended claims.

What is claimed is:

1. A golf item formed from a reactive mixture comprising:
   a first reactable component comprising an isocyanate-containing compound, wherein the isocyanate-containing compound comprises ethylene diisocyanate, propylene-1,2-diisocyanate, tetramethylene-1,4-diisocyanate, 1,6-hexamethylene-diisocyanate, 2,2,4-trimethylhexamethylene diisocyanate, dodecane-1,12-diisocyanate, 2,4,4-trimethylhexamethylene, 4,4-dicylohexyl diisocyanate, 2,4,4-trimethylene diisocyanate, cyclobutane-1,3-diisocyanate, cyclohexane-1,3-diisocyanate, cyclohexane-1,4-diisocyanate, methyl-cyclohexylene diisocyanate, 1-isocyanato-3,3,5-trimethyl-5-isocyanatomethyl cyclohexane, isophoronediisocyanate, 4,4'-diphenylmethane diisocyanate, polymeric 4,4'-diphenylmethane diisocyanate, carbodiimide-modified liquid 4,4'-diphenylmethane diisocyanate, p-phenylene diisocyanate, m-phenylene diisocyanate, toluene diisocyanate, 3,3'-dimethyl-4,4'-biphenylene diisocyanate, naphthalene diisocyanate, xylylene diisocyanate, tetracene diisocyanate, anthracene diisocyanate, the isocyanurate of toluene diisocyanate, the isocyanurate of hexamethylene diisocyanate, the uretdione of toluene diisocyanate, the uretdione of 1,6-hexamethylene-diisocyanate, or mixtures thereof; and
   a second reactable component comprising at least one of a polyol, polyamine, or epoxy-containing compound,
   wherein the reactive mixture is injected into a mold having a desired shape within about 60 seconds or less, and
   wherein the first and second reactable components have a viscosity of less than about 20,000 cPs at ambient temperature or at a temperature at which the reactive mixture is formed.

2. The golf item of claim 1, wherein the isocyanate-containing compound comprises an aliphatic polyisocyanate.

3. The golf item of claim 1, wherein the isocyanate-containing compound comprises greater than about 14 percent isocyanate by weight of the isocyanate-containing compound.

4. The golf item of claim 1, wherein the golf item is a golf ball component.

5. The golf item of claim 4, wherein the golf ball component comprises an outer cover layer having a first material hardness of about 55 Shore D or greater and an inner cover layer having a second material hardness of about 55 Shore D or less.

6. The golf item of claim 5, wherein the golf ball further comprises a core having an outer diameter of about 1.55 inches to about 1.67 inches.

7. The golf item of claim 1, wherein the golf item has a thickness of about 0.065 inches or less.

8. The golf item of claim 1, wherein the second reactable component comprises a polyether polyol, a hydroxy-terminated polybutadiene, a polyester polyol, a polycarbonate polyol, a copolymer, or mixtures thereof.

9. The golf item of claim 1, wherein the first and second reactable components have a viscosity of less than about 10,000 cPs at ambient temperature or at a temperature at which the reactive mixture is formed.

10. The golf item of claim 1, wherein the reactive mixture is injected into the mold within a timeframe of about 0.25 seconds to about 30 seconds.

11. The golf item of claim 10, wherein the timeframe is about 1 second to about 5 seconds.

12. The golf item of claim 1, wherein the reactive mixture further comprises at least one catalyst comprising a metal catalyst, an amine catalyst, an organic acid, a delayed catalyst, or mixtures thereof.

13. The golf item of claim 12, wherein the at least one catalyst is present in an amount from about 0.001 percent to about 3 percent by weight of the composition.

14. The golf item of claim 1, wherein the reactive mixture further comprises at least one filler present in an amount from about 0.1 percent to about 50 percent by weight of the reactive mixture.

15. A multi-layer golf ball comprising at least one core layer and a cover comprising an inner cover layer and an outer cover layer disposed about the at least one core layer, wherein at least one of the cover layers is formed from a reaction injection molded material comprising:
a first reactable component comprising an isocyanate comprising greater than about 14 percent by weight isocyanate groups; and
a second reactable component comprising at least one of a polyol, polyamine, or epoxy-containing compound,
wherein the reactive mixture is injected into a mold having a desired shape within about 60 seconds or less.

16. The golf ball of claim 15, wherein the golf ball comprises a solid or fluid-filled core.

17. The golf ball of claim 15, which further comprises at least one intermediate layer disposed about the at least one core layer.

18. The golf ball of claim 17, wherein the intermediate layer is a wound layer or comprises a reaction-injection-molded material.

19. Golf equipment, or a portion thereof, which comprises:
a first reactable component comprising an isocyanate-containing compound having a viscosity of about 20,000 cP; and
a second reactable component comprising at least one of a polyol, polyamine, or epoxy-containing compound and having a viscosity of about 20,000 cP,
wherein the golf equipment, or portion thereof, is formed by reaction injection molding of the first and second reactable components, which react with each other after contact sufficiently to be substantially gelled or solidified within about 60 seconds, and wherein the isocyanate-containing compound has the generic structure, O=C=N—R—N=C=O, where R is a cyclic, aromatic, or linear branched or unbranched hydrocarbon chain each having a moiety containing from about 1 to 20 carbon atoms; a dimeric or multimeric adduct of a diisocyanate; a triisocyanate or higher functional polyisocyanate that is not an adduct of a diisocyanate; or a mixture thereof.

20. The golf equipment of claim 19, comprising a portion of a multi-layer golf ball.

21. The golf equipment of claim 20, wherein the multi-layer golf ball comprises an outer cover layer having a first material hardness of about 55 Shore D or greater and an inner cover layer having a second material hardness of about 55 Shore D or less.

22. The golf equipment of claim 21, wherein the multi-layer golf ball further comprises a core having an outer diameter of about 1.55 inches to about 1.67 inches.

23. The golf equipment of claim 19, wherein the isocyanate-containing compound comprises ethylene diisocyanate, propylene-1,2-diisocyanate, tetramethylene -1,4-diisocyanate, 1,6-hexamethylene-diisocyanate, 2,2,4-trimethylhexamethylene diisocyanate, dodecane-1,12-diisocyanate, 2,4,4-trimethylhexamethylene, 4,4'-dicyclohexyl diisocyanate, 2,4,4-trimethylene diisocyanate, cyclobutane-1,3-diisocyanate, cyclohexane-1, 3diisocyanate, cyclohexane-1,4-diisocyanate, methylcyclohexylene, diisocyanate, 1-isocyanate-3,3,5-trimethyl-5-isocyanatomethyl cyclohexane, isophoronediisocyanate, 4,4'-diphenylmethane diisocyanate, polymeric 4,4'-diphenylmethane diisocyanate, carbodiimide-modified liquid 4,4'-diphenylmethane diisocyanate, p-phenylene diisocyanate, m-phenylene diisocyanate, toluene diisocyanate, 3,3'-dimethyl-4,4'-biphenylene diisocyanate, naphthalene diisocyanate, xylylene diisocyanate, tetracene diisocyanate, anthracene diisocyanate, the isocyanurate of toluene diisocyanate, the isocyanurate of hexamethylene diisocyanate, the uretdione of toluene diisocyanate, the uretdione of 1,6-hexamethylene-diisocyanate, or mixtures thereof.

24. The golf equipment of claim 19, wherein the isocyanate-containing compound comprises an aliphatic polyisocyanate.

25. The golf equipment of claim 19, wherein the isocyanate-containing compound comprises greater than about 14 percent isocyanate by weight of the isocyanate-containing compound.

26. The golf equipment of claim 19, wherein the polyol is selected from the group consisting of a polyether polyol, a hydroxy-terminated polybutadiene, a polyester polyol, a polycarbonate polyol, and mixtures thereof.

27. The golf equipment of claim 19, wherein the reaction of the first and second reactable components occurs within a timeframe of about 0.25 seconds to 30 seconds.

28. The golf equipment of claim 19, wherein the reactive mixture further comprises at least one catalyst comprising a metal catalyst, an amine catalyst, an organic acid, a delayed catalyst, or mixtures thereof.

29. A golf ball having a cover and a core, wherein the cover is formed from a reactive mixture comprising:
- a first reactable component comprising an isocyanate-containing compound, wherein the isocyanate-containing compound comprises ethylene diisocyanate, propylene-1,2-diisocyanate, tetramethylene-1,4-diisoeyanate, 1,6-hexamethylene-diisocyanate, 2,2,4-trimethyihexamethylene diisocyanate, dodocane-1,12-diisocyanate, 2,4,4-trimethylhexamethylene, 4,4'-dicylohexyl diisocyanate, 2,4,4-trimethylene diisocyanate, cyclobutne-1,3-diisocyanate, cyclohexane-1,3-diisocyanate, cyclohexane-1,4-diisocyanate, methyl-cyclohexylene diisocyanate, 1-isocyanato-3,3,5-trimethyl-5-isocyanatomethyl cyclohexane, isophoronediisocyanate, 4,4'-diphenylmethane diisocyanate, polymeric 4,4'-diphenylmethane diisocyanate, carbodiimide-modified liquid 4,4'-diphenylmethane diisocyanate, p-phenylene diisocyanate, m-phenylene diisocyanate, toluene diisocyanate, 3,3'-dimethyl-4,4'-biphenylene diisocyanate, naphthalene diisocyanate, xylylene diisocyanate, tetracene diisocyanate, anthracene diisocyanate, the isocyanurate of toluene diisocyanate, the isocyanurate of hexamethylene diisocyanate, the uretdione of toluene diisocyanate, the uretdione of 1,6-hexamethylene-diisocyanate, or mixtures thereof; and
- a second reactable component comprising at least one of a polyol, polyamine, or epoxy-containing compound,
- wherein the reactive mixture is injected into a mold having a desired shape within about 0.25 seconds to about 30 seconds, and
- wherein the isocyanate-containing compound comprises greater than about 14 percent by weight unreacted isocyanate groups.

30. The golf ball of claim 29, wherein the cover comprises an outer cover layer having a first material hardness of about 55 Shore D or greater and an inner cover layer having a second material hardness of about 55 Shore D or less.

31. A method for forming golf equipment, or a portion thereof, which comprises:
- providing a first reactable component comprising an isocyanate-containing compound; and a second reactable component comprising at least one of a polyol, polyamine, or epoxy-containing compound; and
- combining the reactable components together to form a reactive mixture, wherein the first and second reactable components each have a viscosity of less than about 20,000 cPs at ambient temperature or at a temperature at which the reactive mixture is formed; and injecting the reactive mixture into a cavity or mold having a desired shape within about 60 seconds after the combining to avoid substantial gelation or solidification so as to provide at least a portion of the golf equipment,
- wherein the isocyanate-containing compound has the generic structure, O═C═N—R—N═C═O, where R is a cyclic, aromatic, or linear branched or unbranched hydrocarbon chain each having a moiety containing from about 1 to 20 carbon atoms; a dimeric or multimetric adduct of a diisocyanate; a triisocyanate or higher functional polyisocyanate that is not an adduct of a diisocyanate; or a mixture thereof.

32. The method of claim 31, wherein the isocyanate-containing compound comprises greater than about 14 percent by weight unreacted isocyanate groups.

* * * * *